United States Patent
Gitzel et al.

(10) Patent No.: US 12,483,010 B2
(45) Date of Patent: Nov. 25, 2025

(54) MEDIUM VOLTAGE SWITCHING OR CONTROLGEAR MONITORING SYSTEM

(71) Applicant: ABB Schweiz AG, Baden (CH)

(72) Inventors: Ralf Gitzel, Mannheim (DE); Ido Amihai, Bensheim (DE); Aydin Boyaci, Karlsruhe (DE); Marcel Dix, Mannheim (DE); Joerg Gebhardt, Mainz (DE)

(73) Assignee: ABB Schweiz AG, Baden (CH)

( * ) Notice: Subject to any disclaimer, the term of this patent is extended or adjusted under 35 U.S.C. 154(b) by 1024 days.

(21) Appl. No.: 17/543,193

(22) Filed: Dec. 6, 2021

(65) Prior Publication Data
US 2022/0181856 A1 Jun. 9, 2022

(30) Foreign Application Priority Data

Dec. 7, 2020 (EP) .................................... 20212076

(51) Int. Cl.
*H02B 13/065* (2006.01)
*G01J 5/00* (2022.01)
(Continued)

(52) U.S. Cl.
CPC .......... *H02B 13/065* (2013.01); *G01J 5/0096* (2013.01); *H04N 23/20* (2023.01); *H01H 2001/0021* (2013.01); *H02B 3/00* (2013.01)

(58) Field of Classification Search
CPC ...... H02B 13/065; H02B 3/00; H02B 13/025; G01J 5/0096; H04N 5/33; H04N 23/20;
(Continued)

(56) References Cited

U.S. PATENT DOCUMENTS

2018/0283954 A1* 10/2018 Patel ...................... G01K 13/04
2018/0307947 A1* 10/2018 Choi ....................... G06F 18/22
(Continued)

FOREIGN PATENT DOCUMENTS

| CN | 110992354 A | 4/2020 |
|---|---|---|
| CN | 111967571 A | 11/2020 |
| EP | 3706267 A1 | 9/2020 |

OTHER PUBLICATIONS

Baur et al., "Deep Autoencoding Models for Unsupervised Anomaly Segmentation in Brain MR Images," *International MICCAI Brainlesion Workshop*, 9 pp. (Sep. 16, 2018).
(Continued)

Primary Examiner — Lisa M Caputo
Assistant Examiner — Michael J Singletary
(74) *Attorney, Agent, or Firm* — Leydig, Voit & Mayer, Ltd.

(57) ABSTRACT

A medium voltage switchgear or controlgear monitoring system includes: an infrared camera; and a processing unit. The infrared camera is mounted within a medium voltage switchgear or controlgear. The infrared camera is configured to acquires an infrared image including image data of two or three current carrying parts of the switchgear or control gear. The two or three current carrying parts are the same current carry part of two or three equivalent systems within the switchgear or controlgear. The infrared camera provides the infrared image to the processing unit. The processing unit determines that the two or three current carrying parts are operating correctly or that one of the two or three current carrying parts has a fault. The determination includes analysis of the infrared image by an autoencoder implemented by the processing unit.

12 Claims, 2 Drawing Sheets

(51) Int. Cl.
*H01H 1/00* (2006.01)
*H02B 3/00* (2006.01)
*H04N 23/20* (2023.01)

(58) Field of Classification Search
CPC ............ H01H 2001/0021; G06F 18/22; G06F 18/2155; G06N 3/045; G06N 3/08; G06N 3/088; G06V 10/761; G06V 10/143; G06V 20/52; G06T 2207/10048; G06T 2207/20084; G06T 11/00; G06T 7/0004
See application file for complete search history.

(56) References Cited

U.S. PATENT DOCUMENTS

| | | | |
|---|---|---|---|
| 2019/0197236 A1 | 6/2019 | Niculescu-Mizil et al. | |
| 2020/0149969 A1* | 5/2020 | Patel | G01K 13/10 |
| 2021/0124327 A1* | 4/2021 | Parfitt | G01J 5/12 |
| 2021/0233219 A1* | 7/2021 | Wildermuth | G06T 7/337 |
| 2022/0057271 A1* | 2/2022 | Gitzel | G01J 5/0066 |

OTHER PUBLICATIONS

Chow et al., "Anomaly detection of defects on concrete structures with the convolutional autoencoder," *Advanced Engineering Informatics*, 45 (2020): 101105 (Aug. 2020).

Lile et al., "Anomaly detection in thermal images using deep neural networks," *2017 IEEE International Conference on Image Processing (ICIP)*, pp. 2299-2303 (Sep. 17-20, 2017).

Lu et al., "Anomaly Detection for Skin Disease Images Using Variational Autoencoder," *Preprint arXiv—Cornell University Library*, pp. 1-8 (Jul. 24, 2018).

Nie et al., "Glad: Global and Local Anomaly Detection," *2020 IEEE International Conference on Multimedia and Expo (ICME)*, pp. 1-6 (Jul. 6-10, 2020).

Sabokrou et al., "Deep-Cascade: Cascading 3D Deep Neural Networks for Fast Anomaly Detection and Localization in Crowded Scenes," *IEEE Transactions on Image Processing*, 26(4): 1992-2004 (Apr. 2017).

Sabokrou et al., "Video anomaly detection and localisation based on the sparsity and reconstruction error of auto-encoder," *Electronics Letters*, 52(13): 1122-1124 (Jun. 23, 2016).

Sun et al., "Learning Sparse Representation With Variational Auto-Encoder for Anomaly Detection," *IEEE Access*, 6: 33353-33361 (Jun. 15, 2018).

Ran et al., "A Survey of Predictive Maintenance: Systems, Purposes and Approaches," *IEEE Communications Surveys & Tutorials*, 36 pp. (Nov. 2019).

Tang et al., "Anomaly Detection Neural Network with Dual Auto-Encoders GAN and its Industrial Inspection Applications," *Sensors*, 20(3336):11 pp. (Jun. 12, 2020).

Wildermuth et al., "Infrared temperature sensing in electrical equipment by low-cost IR cameras," *VDE High Voltage Technology 2018; ETG-Symposium*, pp. 200-204 (Dec. 17, 2018).

European Patent Office, Extended European Search Report in European Patent Application No. 20212076.2, 10 pp. (May 31, 2021).

The Patent Office of the People's Republic of China, Office Action in Chinese Patent Application No. 202111478036.7, 9 pp. (Dec. 13, 2024).

* cited by examiner

An autoencoder trained on healthy data...

Is not good at giving the phases different temperatures

MEDIUM VOLTAGE SWITCHING OR CONTROLGEAR MONITORING SYSTEM

FIELD OF THE INVENTION

The present invention relates to a medium voltage switchgear or control gear monitoring system and medium voltage switchgear or control gear monitoring method.

BACKGROUND OF THE INVENTION

Given an infrared thermographic (IRT) camera, it is possible to monitor the state of medium voltage electrical circuits. In certain common failure situations, parts of the electrical circuit will become hotter than normal, which is clearly visible in the IRT image. However, it is not practical for a human to look at these images continuously. Some sort of algorithm is needed that recognizes these special changes in the image and gives an alert.

There is a need to address this problem.

SUMMARY OF THE INVENTION

Therefore, it would be advantageous to have an improved technique to determine a fault in an electrical circuit of a medium voltage switchgear or control gear.

The object of the present invention is solved with the subject matter of the independent claims, wherein further embodiments are incorporated in the dependent claims.

In a first aspect, there is provided a medium voltage switchgear or control gear monitoring system, comprising:
  an infrared camera; and
  a processing unit.

The infrared camera is configured to be mounted within a medium voltage switchgear or control gear. The infrared camera is configured to acquire an infrared image. The infrared image comprises image data of two or three current carrying parts of the switchgear or control gear. The two or three current carrying parts are the same current carry part of two or three equivalent systems within the switchgear or control gear. The infrared camera is configured to provide the infrared image to the processing unit. The processing unit is configured to determine that the two or three current carrying parts are operating correctly or that one of the two or three current carrying parts has a fault, where this determination comprises analysis of the infrared image by an autoencoder implemented by the processing unit.

Thus a neural network in the form of an autoencoder is utilized to determine a fault in a current carrying par of for example a switchgear. The autoencoder is good at reproducing images that it has been trained with, but not good at reproducing images that it has not been trained with. Thus, when trained with images of two or more correctly functioning current carrying parts of a switchgear the autoencoder can reproduce such input images imagery such that a generated output image matches the input image within a threshold. However, if one of the current carrying parts is faulty and is at a higher temperature than it should be the associated imagery will represent this higher temperature for this part with respect to the other parts. When this new image representing a fault is input to the autoencoder, the output it generates cannot match the input within the threshold and an alarm can be generated that there is a fault.

In an example, the autoencoder is configured to utilize the infrared image to generate a synthetic infrared image. The synthetic infrared image comprises synthetic image data of the two or three current carrying parts of the switchgear or control gear. The determination that the two or three current carrying parts are operating correctly or that one of the two or three current carrying parts has a fault comprises a comparison of the infrared image with the synthetic infrared image.

In an example, the processing unit is configured to determine that one of the two or three current carrying parts has a fault on the basis that a distance metric between at least one region of the infrared image and an equivalent at least one region of the synthetic infrared image is equal to or exceeds a threshold value.

In an example, the processing unit is configured to determine that the two or three current carrying parts are operating correctly on the basis that a distance metric between at least one region of the infrared image and an equivalent at least one region of the synthetic infrared image is less than a threshold value.

In an example, the threshold value utilized in the determination that one of the two or three current carrying parts has a fault is the same threshold value utilized in the determination that the two or three current carrying parts are operating correctly.

In an example, the distance metric comprises a root mean squared error.

In an example, the autoencoder is a trained autoencoder trained on the basis of a plurality of images. Each image comprises image data of two or three current carrying parts of a switchgear or control gear, and in each image the two or three current carrying parts are operating correctly.

In an example, the processing unit is configured to update the training of the autoencoder. The update comprises utilization of the infrared image.

In an example, the processing unit is configured to generate an alarm signal based on a determination that one of the two or three current carrying parts has a fault.

In an example, the two or three current carrying parts are the same current carry part of two or three phases within the switchgear or control gear.

In a second aspect, there is provided a medium voltage switchgear or control gear monitoring method, comprising:
  a) acquiring an infrared image with infrared camera mounted within a medium voltage switchgear or control gear, wherein the infrared image comprises image data of two or three current carrying parts of the switchgear or control gear, and wherein the two or three current carrying parts are the same current carry part of two or three equivalent systems within the switchgear or control gear;
  b) providing a processing unit with the infrared image; and
  c) determining by the processing unit that the two or three current carrying parts are operating correctly or that one of the two or three current carrying parts has a fault, wherein the determining comprises analysing the infrared image by an autoencoder implemented by the processing unit.

In an example, the method comprises utilizing the infrared image by the autoencoder to generate a synthetic infrared image, wherein the synthetic infrared image comprises synthetic image data of the two or three current carrying parts of the switchgear or control gear, and wherein the determining that the two or three current carrying parts are operating correctly or that one of the two or three current carrying parts has a fault comprises comparing the infrared image with the synthetic infrared image.

In an example, the method comprises determining by the processing unit that one of the two or three current carrying parts has a fault on the basis that a distance metric between at least one region of the infrared image and an equivalent at least one region of the synthetic infrared image is equal to or exceeds a threshold value.

In an example, the method comprises determining by the processing unit that the two or three current carrying parts are operating correctly on the basis that a distance metric between at least one region of the infrared image and an equivalent at least one region of the synthetic infrared image is less than a threshold value.

In an example, the autoencoder is a trained autoencoder trained on the basis of a plurality of images, wherein each image comprises image data of two or three current carrying parts of a switchgear or control gear, and wherein in each image the two or three current carrying parts are operating correctly.

The above aspects and examples will become apparent from and be elucidated with reference to the embodiments described hereinafter.

BRIEF DESCRIPTION OF THE DRAWINGS

Exemplary embodiments will be described in the following with reference to the following drawing.

DETAILED DESCRIPTION OF EMBODIMENTS

Figure 1:
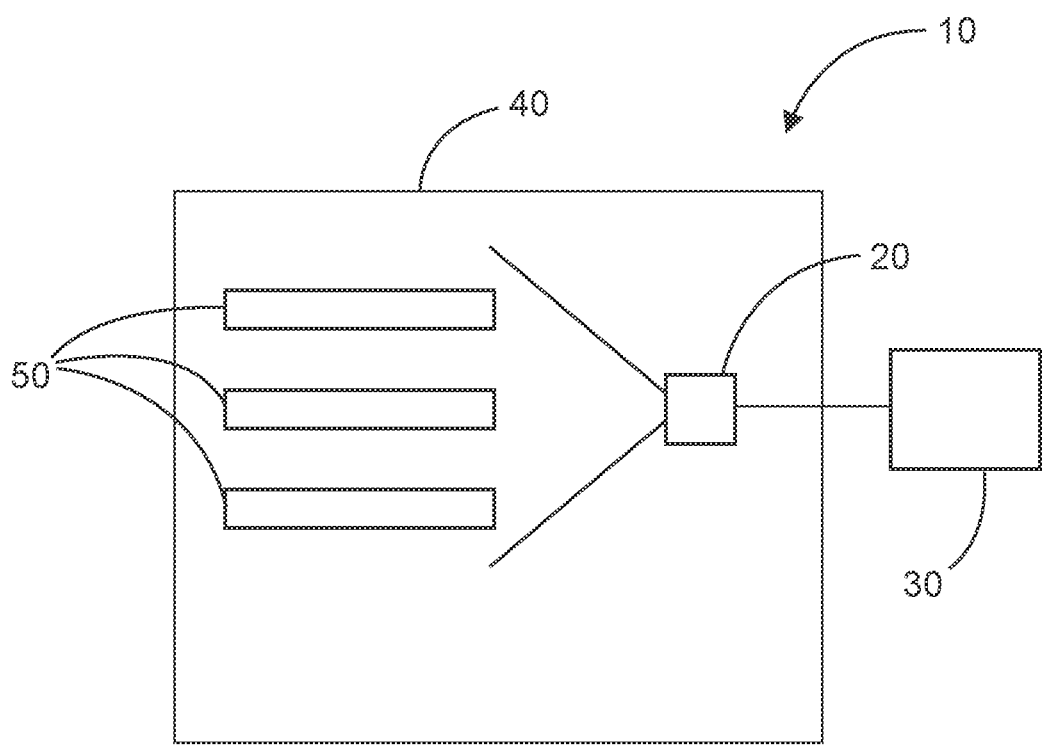
FIG. 1 shows a schematic representation of an exemplar medium voltage switchgear or control gear monitoring system.

FIG. 1 shows an example of a medium voltage switchgear or control gear monitoring system 10. The system 10 comprises an infrared camera 20, and a processing unit 30. The processing unit can be housed with the camera or can be separate to the camera and communication between the camera and processing unit can be wired or wireless. The infrared camera is configured to be mounted within a medium voltage switchgear or control gear 40. The infrared camera is configured to acquire an infrared image. The infrared image comprises image data of two or three current carrying parts of the switchgear or control gear 50. The two or three current carrying parts are the same current carry part of two or three equivalent systems within the switchgear or control gear. The infrared camera is configured to provide the infrared image to the processing unit. The processing unit is configured to determine that the two or three current carrying parts are operating correctly or that one of the two or three current carrying parts has a fault. This determination comprises analysis of the infrared image by an autoencoder implemented by the processing unit.

According to an example, the autoencoder is configured to utilize the infrared image to generate a synthetic infrared image. The synthetic infrared image comprises synthetic image data of the two or three current carrying parts of the switchgear or control gear. The determination that the two or three current carrying parts are operating correctly or that one of the two or three current carrying parts has a fault comprises a comparison of the infrared image with the synthetic infrared image.

An image as such need not be generated, just the data that could be utilized to generate an image and this synthetic data is compared against the actual acquired infrared data.

According to an example, the processing unit is configured to determine that one of the two or three current carrying parts has a fault on the basis that a distance metric between at least one region of the infrared image and an equivalent at least one region of the synthetic infrared image is equal to or exceeds a threshold value.

According to an example, the processing unit is configured to determine that the two or three current carrying parts are operating correctly on the basis that a distance metric between at least one region of the infrared image and an equivalent at least one region of the synthetic infrared image is less than a threshold value.

According to an example, the threshold value utilized in the determination that one of the two or three current carrying parts has a fault is the same threshold value utilized in the determination that the two or three current carrying parts are operating correctly.

According to an example, the distance metric comprises a root mean squared error.

According to an example the autoencoder is a trained autoencoder trained on the basis of a plurality of images. Each image comprises image data of two or three current carrying parts of a switchgear or control gear. In each image the two or three current carrying parts are operating correctly.

The training image data could be acquired for the actual switchgear or control gear within which the camera is mounted, for example during a startup training phase when a skilled engineer could confirm that there are no faults. However the training data could be acquired for a different switchgear or control gear, but for example of the same model type as that within which the camera is mounted. Also, once the autoencoder is running, it can be further trained on data that it determines not to be faulty.

In an example, the autoencoder has not been trained on image data where there is a fault in one of the two or three current carrying parts.

According to an example, the processing unit is configured to update the training of the autoencoder, wherein the update comprises utilization of the infrared image.

According to an example, the processing unit is configured to generate an alarm signal based on a determination that one of the two or three current carrying parts has a fault.

According to an example, the two or three current carrying parts are the same current carry part of two or three phases within the switchgear or control gear.

Figure 2:
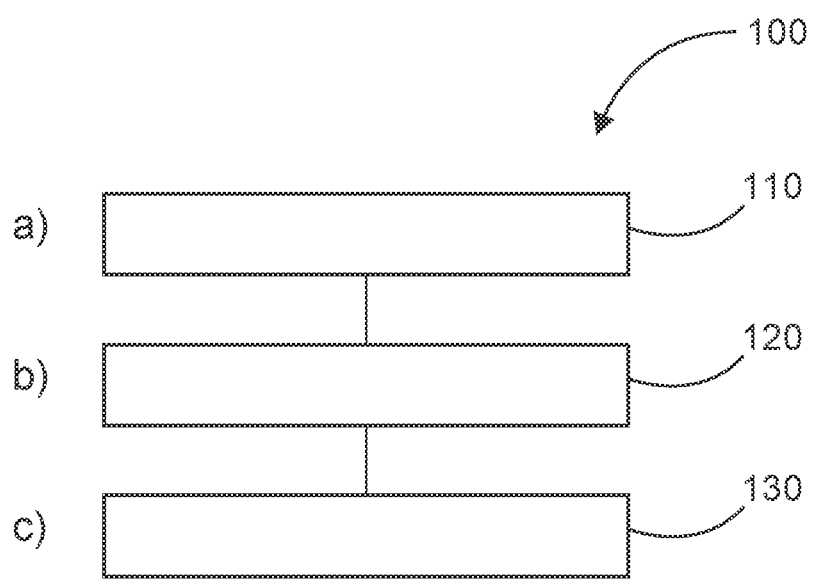
FIG. 2 shows a medium voltage switchgear or control gear monitoring method.

FIG. 2 shows a medium voltage switchgear or control gear monitoring method 100 in its basic steps. The method 100 comprises:

in an acquiring step 110, also referred to as step a), acquiring an infrared image with infrared camera mounted within a medium voltage switchgear or control gear, wherein the infrared image comprises image data of two or three current carrying parts of the switchgear or control gear, and wherein the two or three current carrying parts are the same current carry part of two or three equivalent systems within the switchgear or control gear;

in a providing step 120, also referred to as step b), providing a processing unit with the infrared image; and in a determining step 130, also referred to as step c), determining by the processing unit that the two or three current carrying parts are operating correctly or that one of the two or three current carrying parts has a fault, wherein the determining comprises analysing the infrared image by an autoencoder implemented by the processing unit.

According to an example, the method comprises utilizing the infrared image by the autoencoder to generate a synthetic infrared image, wherein the synthetic infrared image comprises synthetic image data of the two or three current carrying parts of the switchgear or control gear, and wherein the determining that the two or three current carrying parts are operating correctly or that one of the two or three current carrying parts has a fault comprises comparing the infrared image with the synthetic infrared image.

According to an example, the method comprises determining by the processing unit that one of the two or three current carrying parts has a fault on the basis that a distance metric between at least one region of the infrared image and an equivalent at least one region of the synthetic infrared image is equal to or exceeds a threshold value.

According to an example, the method comprises determining by the processing unit that the two or three current carrying parts are operating correctly on the basis that a distance metric between at least one region of the infrared image and an equivalent at least one region of the synthetic infrared image is less than a threshold value.

In an example, the threshold value utilized in the determination that one of the two or three current carrying parts has a fault is the same threshold value utilized in the determination that the two or three current carrying parts are operating correctly.

In an example, the distance metric comprises a root mean squared error.

According to an example, the autoencoder is a trained autoencoder trained on the basis of a plurality of images, wherein each image comprises image data of two or three current carrying parts of a switchgear or control gear, and wherein in each image the two or three current carrying parts are operating correctly.

In an example, the method comprises not training the autoencoder on image data where there is a fault in one of the two or three current carrying parts.

In an example, the method comprises updating by the processing unit the training of the autoencoder, wherein the updating comprises utilizing the infrared image.

In an example, the method comprises generating by the processing unit an alarm signal based on determining that one of the two or three current carrying parts has a fault.

In an example, the two or three current carrying parts are the same current carry part of two or three phases within the switchgear or control gear.

Figure 3:
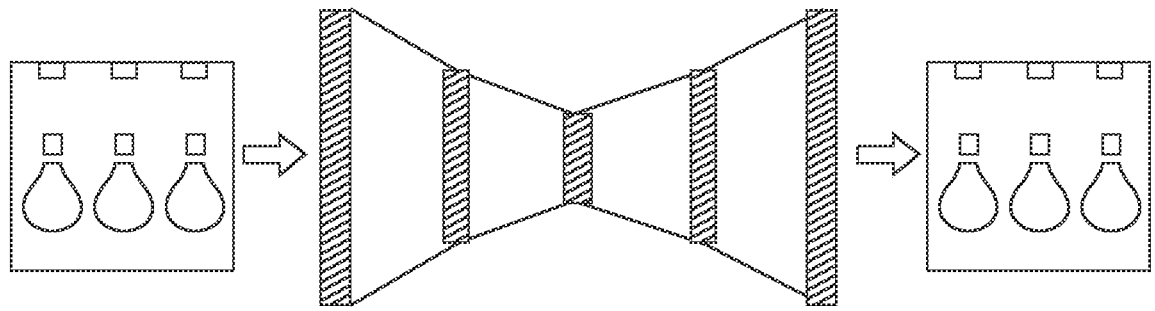
FIG. 3 shows a representation of the working principle of autoencoder based anomaly detection.
Figure 3:
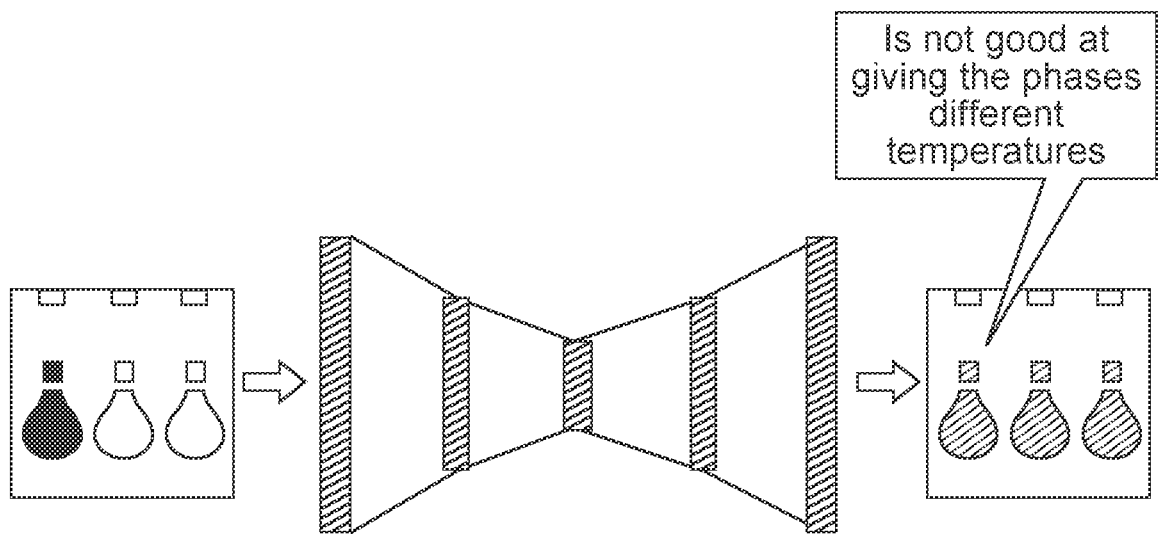

The medium voltage switchgear or control gear monitoring system and medium voltage switchgear or control gear monitoring method are no described in specific detail, where reference is made to FIG. 3. FIG. 3 shows an autoencoder trained on healthy data. Then when the trained auroencoder is presented with heathy input data, as shown in the top image where there current carrying parts are at equivalent temperatures, the output is equivalent to the input. A comparison between the output and the input can then be used to determine that there is no fault. However, when the trained autoencoder is presented with input data, where there is a fault—for example one current carrying part is hotter than the other two—the autoencoder cannot accurately reproduce this and the output can be for example an output of three current carrying parts having each having an equivalent temperature that could be slightly higher than normal. But then a comparison between the input and the output can be used to indicate that there is a problem, because the input and output are different.

Thus, problems with electrical equipment carrying high current at high voltage show up in infrared images taken of such equipment. This inventors realised that a specific type of neural networks called an autoencoder could be used to detect anomalies in infrared images of electrical equipment. When trained on infrared images of healthy equipment, the autoencoders produce abnormal results when provided with images of faulty equipment. A distance metric can be used to understand if the deviation is big enough to call for an alarm.

Autoencoders are neural networks, which reproduce the input they are given as good as they can in their output. While it would be trivial to develop an algorithm that passes on its input unchanged, autoencoders add an element of complexity. The central layers of the autoencoder are smaller than the input and output. Thus, they are forced to come up with suitable "compression techniques" in order to convey the information content. During training, the autoencoder learns a "compression technique" which is optimized for its particular kind of data. For example, an autoencoder trained only on photos of green pears will find a way to compress the iconic pear shape and shades of green quite efficiently. In this compression language it is not possible to express other shapes such as red-blue checkered cubes in a satisfactory manner.

The inventors realised that such autoencoders could be used to detect faults in medium voltage switchgear and medium voltage control gear. The autoencoder is trained on IRT images of healthy electrical equipment and the autoencoder is then very be good at reproducing these images. In particular, it will exploit the correlation between the two or three phases of the system, which will be at very similar temperature levels. Thus, the output provided by the autoencoder is similar to the input, within limits or thresholds, and this can be used to determine that there is no fault in any of the two or three phases with respect to current carrying parts. This is shown in the top image of FIG. 3.

However, when an image fed into the trained system is a representative of a faulty case (where one phase is a hotter than the other one or two phases), the autoencoder system cannot produce a good reconstruction, because the strong correlation is no longer present. The output image is then different to the input image, within a limit or threshold, and the degree of difference can be used to initiate an alarm. This is shown in the bottom image of FIG. 3.

Thus, in one specific embodiment a system is provided with an infrared camera and a processor running such a trained autoencoder, which continuously records IRT images of critical sections in an electrical or electronic system such as switchgear. The images are fed to the autoencoder that was trained on healthy images. If the distance (a distance metric) between input and output exceeds a certain level, an anomaly alarm is triggered.

The system can also record the images and continuously update the training of the autoencoder as alarms are acquitted as harmless—in other words use images as further training that it has determined to be healthy.

Thus, in the autoencoder the above is exploited by comparing the input and output images using a distance metric (such as but not limited to root squared mean error). If the distance is above a certain threshold, the image is an anomaly and an alarm is produced, and if the distance is below a metric that indicates that the input data relates to a healthy operation the image can be used to further train the autoencoder. The limit for the alarm and the limit for the image to be used for training can be the same or different. Thus, it may be desired to raise an alarm when a system has moved a certain amount away from being healthy, but an image may want to only be used for further training when it represents a very healthy case and where the output image is particularly similar to the input image.

Advantageously, in the new system only healthy data is required for training of the autoencoder, where such data is easily obtained. This completely differs to existing system that require both healthy and faulty data for training, and where it is always difficult to obtain the required faulty data in order to robustly train such a system. The present system is robustly trained only with healthy data The concept of using an autoencoder-driven anomaly detection on IRT images for the detection of faults in switchgear and control gear is completely new, and has exploited the special behaviour of electrical equipment, i.e. the high correlation between phase temperatures in the healthy case along with the specific use of an autoencoder trained only on healthy images.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

The invention claimed is:

1. A medium voltage switchgear or controlgear monitoring system, comprising:
   an infrared camera; and
   a processing unit,
   wherein the infrared camera is configured to be mounted within a medium voltage switchgear or controlgear,
   wherein the infrared camera is configured to acquire an infrared image, wherein the infrared image comprises image data of two or three current carrying parts of the switchgear or control gear, and wherein the two or three current carrying parts are the same current carry part of two or three equivalent systems within the switchgear or controlgear;
   wherein the infrared camera is configured to provide the infrared image to the processing unit, and
   wherein the processing unit is configured to determine that the two or three current carrying parts are operating correctly or that one of the two or three current carrying parts has a fault, wherein the determination comprises analysis of the infrared image by an autoencoder implemented by the processing unit.

2. The system of claim 1, wherein the autoencoder is configured to utilize the infrared image to generate a synthetic infrared image,
   wherein the synthetic infrared image comprises synthetic image data of the two or three current carrying parts of the switchgear or control gear, and
   wherein the determination that the two or three current carrying parts are operating correctly or that one of the two or three current carrying parts has a fault comprises a comparison of the infrared image with the synthetic infrared image.

3. The system of claim 2, wherein the processing unit is configured to determine that one of the two or three current carrying parts has a fault on the basis that a distance metric between at least one region of the infrared image and an equivalent at least one region of the synthetic infrared image is equal to or exceeds a threshold value.

4. The system of claim 2, wherein the processing unit is configured to determine that the two or three current carrying parts are operating correctly on the basis that a distance metric between at least one region of the infrared image and an equivalent at least one region of the synthetic infrared image is less than a threshold value.

5. The system of claim 3, wherein the processing unit is configured to determine that the two or three current carrying parts are operating correctly on the basis that a distance metric between at least one region of the infrared image and an equivalent at least one region of the synthetic infrared image is less than a threshold value, and
   wherein the threshold value utilized in the determination that one of the two or three current carrying parts has a fault is the same threshold value utilized in the determination that the two or three current carrying parts are operating correctly.

6. The system of claim 3, wherein the distance metric comprises a root mean squared error.

7. The system of claim 1, wherein the autoencoder is a trained autoencoder trained on the basis of a plurality of images, wherein each image comprises image data of two or three current carrying parts of a switchgear or control gear, and wherein in each image the two or three current carrying parts are operating correctly.

8. The system of claim 5, wherein the distance metric comprises a root mean squared error, and
   wherein the processing unit is configured to update the training of the autoencoder, wherein the update comprises utilization of the infrared image.

9. The system of claim 1, wherein the processing unit is configured to generate an alarm signal based on a determination that one of the two or three current carrying parts has a fault.

10. The system of claim 1, wherein the two or three current carrying parts are the same current carry part of two or three phases within the switchgear or controlgear.

11. A medium voltage switchgear or controlgear monitoring method, comprising:
    acquiring an infrared image with infrared camera mounted within a medium voltage switchgear or controlgear, wherein the infrared image comprises image data of two or three current carrying parts of the switchgear or control gear, and wherein the two or three current carrying parts are the same current carry part of two or three equivalent systems within the switchgear or controlgear;
    providing a processing unit with the infrared image;
    determining by the processing unit that the two or three current carrying parts are operating correctly or that one of the two or three current carrying parts has a fault, wherein the determining comprises analysing the infrared image by an autoencoder implemented by the processing unit; and
    utilizing the infrared image by the autoencoder to generate a synthetic infrared image,
    wherein the synthetic infrared image comprises synthetic image data of the two or three current carrying parts of the switchgear or control gear, and
    wherein the determining that the two or three current carrying parts are operating correctly or that one of the two or three current carrying parts has a fault comprises comparing the infrared image with the synthetic infrared image based on a distance metric between at least one region of the infrared image and an equivalent at least one region of the synthetic infrared image, comparing the distance metric to a threshold value, and triggering an alarm if the distance metric is equal to or exceeds a threshold value.

12. The method of claim 11, wherein the autoencoder is a trained autoencoder trained on the basis of a plurality of images,
   wherein each image comprises image data of two or three current carrying parts of a switchgear or control gear, and
   wherein in each image the two or three current carrying parts are operating correctly.

\* \* \* \* \*